No. 682,138.  
J. H. FLEMING.  
CENTRIFUGAL CREAM SEPARATOR.  
(Application filed Jan. 11, 1900.)
Patented Sept. 3, 1901.
(No Model.)
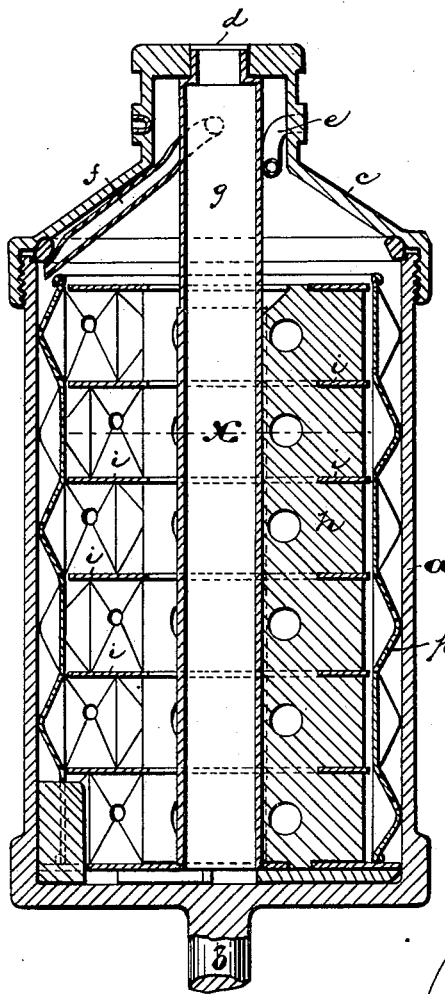
Fig. 1.
Fig. 2.
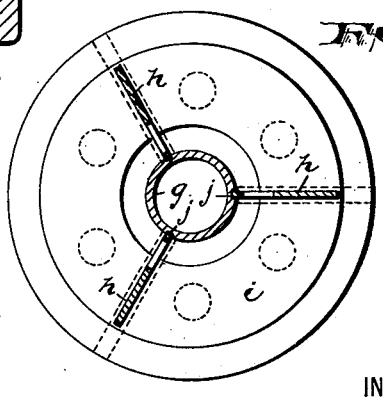
Fig. 3.
Fig. 4.
WITNESSES:
Alfred R. Krantz.
Russell M. Everett.
INVENTOR
James H. Fleming,
BY
Drake & Co.
ATTORNEYS.
THE NORRIS PETERS CO., PHOTO-LITHO., WASHINGTON, D. C.

UNITED STATES PATENT OFFICE.

JAMES H. FLEMING, OF NEWARK, NEW JERSEY.

CENTRIFUGAL CREAM-SEPARATOR.

SPECIFICATION forming part of Letters Patent No. 682,138, dated September 3, 1901.

Application filed January 11, 1900. Serial No. 1,035. (No model.)

*To all whom it may concern:*

Be it known that I, JAMES H. FLEMING, a citizen of the United States, residing at Newark, in the county of Essex and State of New Jersey, have invented certain new and useful Improvements in Skimming Devices for Centrifugal Cream-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The object of this invention is to facilitate the operation of assembling the interior partitions in the bowls of that class of centrifugal cream-separators represented by the one shown in the patent granted to Oscar Anderson on the 16th day of February, 1897, numbered 576,994, to secure greater accuracy of adjustment and obtain a more durable structure and one better adapted to withstand the strain produced by the highly-rapid rotation of the bowl and to secure other advantages and results, some of which may be referred to hereinafter in connection with the description of the working parts.

The invention consists in the improved centrifugal cream-separating bowl and in the arrangements and combinations of parts of the same, all substantially as will be hereinafter set forth and finally embraced in the clauses of the claim.
Referring to the accompanying drawings, in which like letters of reference indicate corresponding parts in each of the several views, Figure 1 is a central vertical section of a centrifugal cream-separating bowl of my improved construction. Fig. 2 is a detail elevation of the milk-supply tube thereof. Fig. 3 is an end view of said tube; and Fig. 4 is a section of the interior partitions, taken at line *x* of Fig. 1.
In said drawings, *a* indicates the bowl, arranged upon a vertical shaft *b* and rotated thereon under the force of power derived from any suitable source. The top of the bowl is commonly provided with a removable top plate or cover *c*, through which are formed an inlet-opening *d* for the new or whole milk, a passage or outlet *e* for the cream, and a passage or outlet *f* for the blue or skim milk. These may be formed and arranged in any manner common in the art.
Coinciding with the opening for the whole or new milk and extending down from said opening at the axial center of the bowl is a supply or feed tube *g*, around which are arranged three (more or less) vertical partitions *h* and a vertical series of horizontal partitions *i i i*, which are effective in producing efficient results in the work of separation, as described in the patent above referred to. To facilitate the assemblage of said parts *g h i* and at the same time obtain an exact and uniform disposition of parts and great strength to resist the effect of the high rotation and centrifugal force induced thereby, I slot the tube longitudinally at points to receive the vertical partitions, as shown at *j j j*, the stock of the tube being made somewhat thicker where said slots are formed, so that said tube will not be weakened by the slotting. Within said slots are arranged the inner edges of the vertical radial partitions either before or after applying the horizontal partitions to said vertical partitions. Inasmuch as the slots are cut by special tools or machinery, the same are brought uniformly at proper distances apart, and they thus serve effectively in giving a uniform and balanced relationship to the inner edges of the vertical partitions, conducing to a proper balancing of the bowl as a whole, and whereas the vertical partitions are held in their radial positions with great firmness and exactness of adjustment by radial slots formed in said horizontal partitions coincident with said vertical slots of the tube said vertical partitions are prevented from drawing out of said slots under stress, but all said parts are firmly bound together with great security. After the parts are assembled and locked in position by thrusting the feed-tube (acting as a key) lengthwise through the collection of partitions said partitions are subjected to a bath of molten tin, and thus all joints are closed, so that no lodgment for dirt or deleterious matter is afforded. In connection with the partitions thus assembled and joined I employ ordinarily an outer cylindrical partition *p*, having peculiar protuberances, a subject of the Anderson patent above referred to.

Having thus described the invention, what I claim as new is—

1. In a cream-separator, the combination with the bowl and longitudinally-slotted feed-tube, arranged at the center of said bowl, of radial partitions arranged vertically in said bowl, the inner edges of said partitions lying in the longitudinal slots and a series of horizontal partitions binding said vertical partitions together and holding the same in the slots, substantially as set forth.

2. In a cream-separator, the combination with the bowl, of a longitudinally-slotted milk-supply tube, the slots of which are disposed at different points about the periphery of said tube, a series of radial partitions, the inner vertical edges of which are fitted and held in said slots, and means for holding said plates in proper relative position with respect to one another, substantially as set forth.

In testimony that I claim the foregoing I have hereunto set my hand this 9th day of September, 1899.

JAMES H. FLEMING.

Witnesses:
CHARLES H. PELL,
C. B. PITNEY.